UNITED STATES PATENT OFFICE.

SIDNEY TRIVICK, OF CLAPHAM COMMON, ENGLAND.

TREATMENT OF GOLD AND SILVER ORES.

SPECIFICATION forming part of Letters Patent No. 706,365, dated August 5, 1902.

Application filed October 30, 1899. Serial No. 735,276. (No specimens.)

*To all whom it may concern:*

Be it known that I, SIDNEY TRIVICK, residing at Durham House, Clapham Common, in the county of Surrey, England, have invented a certain new and useful improved process whereby metals may be extracted from their ores by the gradual and prolonged generation, in the midst of the mass of the ore, of the element chlorin in the nascent condition, so as to effect the chlorination of the metals, permitting them to be dissolved out of the ore rapidly and with a minimum expenditure of chemical reagents; and I do hereby declare the following to be a full, clear, and exact description of the invention, such as will enable others skilled in the art to which it appertains to make and use the same.

The chemical part of the process in which my invention lies consists in adding to the ore two dilute solutions in properly-adjusted proportions, one being a solution of calcium hypochlorite or a solution of hypochlorite of the alkali metals—namely, sodium hypochlorite or potassium hypochlorite—and the other a solution of a suitable metallic salt. Ferric chlorid and ferric sulfate are among those which satisfy the conditions of my process in the most efficient manner. Other metallic salts than these imitate the action of the two I have named with only small difference in their behavior.

In order to more clearly indicate the distinctive features of my process, I will refer to other processes and point out those of their defects which are absent in mine.

One of the ordinary methods of chlorination for the purpose of extracting metals from extraneous material is by the use of chlorid of lime and an acid; but such a process is crude and wasteful, because in the first place commercial chlorid of lime consists not only of a chlorin-producing compound, $CaOCl_2$, but also of an acid-absorbing material, calcium hydrate, which is present to the extent of from twenty-five per cent. to thirty-five per cent. in good samples and which uses up a considerable fraction of the acid which is provided, while serving no useful purpose. In the second place, the chlorin is generated under conditions which require the larger part to immediately assume the molecular condition. The chlorination has to be performed in closed chambers to prevent the escape of the chlorin gas, and its union with the metals takes place much more slowly and less surely than chlorin which is in the nascent condition. The process is subject also to the disadvantage due to the difficulty and danger of conveying concentrated acids to the place of use. In recognition of the last-mentioned disadvantage it has been proposed by Vautin, in British Patent 12,641 of 1890, to substitute ferric chlorid or manganous chlorid for the acid which is to be added to the chlorid of lime to effect the liberation of the chlorid therefrom, and when the former salt is used Vautin prescribes the mixing with the ore of nearly equal parts of chlorid of lime and ferric chlorid and the treatment with the ore in a nearly dry condition, five per cent. of water only being added.

To distinguish my invention from Vautin's, I will point out that in mixing chlorid of lime with the metallic salt and the ore to be operated on Vautin introduces calcium hydrate, which, as before mentioned, is a large component of chlorid of lime. This, as in the acid process, is wasteful, for it uses up a considerable proportion of the metallic salt without producing any useful effect. Again, Vautin mixes as much chlorid of lime with the ore as ferric chlorid. Such a quantity is largely in excess of what is requisite, and inasmuch as the excess also is accompanied by its wasteful component, calcium hydrate, and otherwise partly prevents the liberation of chlorin the quantity of ferric chlorid which is available to perform the duty of liberating chlorin is very small.

In carrying out my process I first eliminate the calcium hydrate by adding water to the chlorid of lime, which gives me a solution of calcium hypochlorite mixed with a solution of calcium chlorid. The calcium hydrate being little soluble in water settles down as a solid and may be separated out.

If the chlorid of lime which is used is of such a quality as to contain thirty-five per cent. of chlorin, the quantity of calcium hypochlorite which I obtain in my solution will be about thirty-five per cent. of the weight of the chlorid of lime used. The clear solution thus obtained is then rapidly mixed with a sufficient solution of ferric chlorid and the mixture added to the metalliferous ore. It is of the greatest importance that the calcium hypochlorite should not be present in excess, either locally or in total, or a precipitate will be formed which will prevent the liberation of a part of the chlorin. If a sufficient quantity of ferric chlorid is present, the reaction which takes place commences with the formation of ferric hydrate and monoxid of chlorin, which immediately react on one another, causing the production of ferric hypochlorite. This salt in the presence of additional ferric chlorid and water will slowly decompose by the liberation of chlorin and the precipitation of ferric hydrate; but in the presence of metals which are ready to absorb the nascent chlorin this latter decomposition takes place rapidly. In the absence of such metals the decomposition takes place comparatively slowly. Thus the generation of the chlorin is delayed until fresh surfaces of metals or metallic compounds which have an affinity for chlorin are presented to the ferric hypochlorite. Under these circumstances very little, if any, molecular chlorin gas is formed. On generation the chlorin attacks in its nascent condition metals which come in its way. The chlorination of the metal is accompanied by the deposit of ferric hydrate on its surface, which to a certain extent protects the metal from further action until the film has been swept away and a clean surface presented to the ferric hypochlorite. Accordingly in order that the process may be continuous and expeditious the metalliferous ore should preferably be kept in motion, which will effect a continual cleansing of the surfaces of the particles of metal which it contains.

Supposing commercial ferric chlorid to have a composition represented by the formula $FeCl_3 6(H_2O)$ and that the chlorid of lime contains thirty-five per cent. of chlorin, the percentage proportion of iron salt to chlorid of lime which is requisite in making the two solutions to exactly complete the reactions is forty-seven to fifty-three; but on account of the importance of the presence of sufficient ferric chlorid, both locally as well as entirely, in order to avoid the immediate formation of a precipitate (and the rapid evolution of chlorin gas) it is advisable to use ferric chlorid somewhat in excess. The use of about equal weights of ferric chlorid and chlorid of lime in making the solutions will probably produce the best practical result. This practical rule must not be confounded with Vautin's prescription—namely, to mix equal quantities of chlorid of lime and ferric chlorid directly together. The latter would produce not more than one-fourth the quantity of chlorin which would be generated by my process, and the greater part of that would be molecular and less active in chlorination than the nascent chlorin liberated as I propose.

If ferric sulfate is substituted for ferric chlorid, the result of the reactions differs from the previous result only in the formation of some calcium sulfate instead of calcium chlorid in the waste products. In this case the reaction produces ferric hydrate and monoxid of chlorin, as in the previous case, and also in addition ferric chlorid and calcium sulfate, so that the requisite ferric chlorid required for the liberation of nascent chlorin is manufactured out of the reagents instead of being directly provided in one of them. The percentage proportions of ferric sulfate to chlorid of lime which would be chemically necessary would be thirty-six to sixty-four, and about forty to sixty should practically be used in forming the solutions. Other metallic salts—as, for example, manganous chlorid—would cause the same kind of reactions; but instead of detailing their actions and founding a special claim on any one of them I rely on their being regarded as an imitation of the process which happens when ferric chlorid or ferric sulfate is used.

Not only may other metallic salts be substituted for the iron salts, as above described, but some other hypochlorites may be substituted for calcium hypochlorite—namely, sodium hypochlorite and potassium hypochlorite. With these the reactions are of the same character with the same result. In the case of the former sodium takes the place of the calcium, other things remaining the same, and in the case of the latter potassium is substituted for calcium. With these as with calcium hypochlorite the result is to obtain a hypochlorite of the metal which is added in the metallic salt, which in the presence of a chlorid of that metal evolves nascent chlorin whenever it comes in contact with a metallic surface. When sodium or potassium hypochlorite is used, the stage of the process corresponding to the production of calcium hypochlorite from chlorid of lime is omitted, those other hypochlorites being directly provided. Before adding the solutions the metalliferous ore is pulverized to as fine a state of division as circumstances will permit, and if it contains any quantity of sulfids it will be desirable to submit the ore to a preliminary roasting process. If it contains ferrous salts, carbonates, metallic iron, arsenical ores, antimonial ores, zinc-blende, or talc, it will in such a case also probably be desirable to subject the ore to roasting, chlorid of sodium being used in the operation or not, according to circumstances.

The operations here referred to are of the ordinary kind and form no portion of my invention, though it is of the greatest importance that they be carefully carried out in order that the metals which it is desired to extract may be reached by and rendered susceptible to the influence of the nascent chlorin, which by my process is ready to attack them. For the same reason, as previously explained, the ore may advantageously be kept continually in motion during the process. Very dilute solutions may be employed, such as 0.2 per cent. and upward, as occasion may require, the strength of the solutions and the quantity used depending on the nature and composition of the materials to be treated. Usually two or three hours will be found sufficient to complete the chlorination. If silver is present, the chlorid of silver which will be formed will be dissolved by the calcium chlorid which is present, or a solution of chlorid of sodium may be used for that purpose.

Telluride gold ores yield readily to this process of chlorination, permitting the extraction of the gold and the tellurium.

I claim—

1. A process for evolving nascent chlorin and effecting the chlorination of metals in order that they may be extracted from a metalliferous mass by rendering them solvent consisting in adding to the mass a mixture in definite proportions of two dilute solutions, one being a solution of calcium hypochlorite free from calcium hydrate, and the other a solution of ferric chlorid, the proportions being such as to result in the formation of ferric hypochlorite leaving some excess of ferric chlorid, which will evolve nascent chlorin.

2. A process for evolving nascent chlorin and effecting the chlorination of metals in order that they may be extracted from a metalliferous mass by rendering them solvent consisting in adding to the mass a mixture in definite proportions of two dilute solutions, one being a solution of calcium hypochlorite free from calcium hydrate, and the other a solution of ferric salt, the proportions being such as to result in the formation of ferric hypochlorite and ferric chlorid which will evolve nascent chlorin.

3. A process for evolving nascent chlorin and effecting the chlorination of metals in order that they may be extracted from a metalliferous mass by rendering them solvent consisting in adding to the mass a mixture in definite proportions of two dilute solutions, one being a solution of hypochlorite of a metal of the alkali groups, and the other a solution of ferric chlorid, the proportions being such as to result in the formation of ferric hypochlorite leaving some excess of ferric chlorid, which will evolve nascent chlorin.

4. A process for evolving nascent chlorin and effecting the chlorination of metals in order that they may be extracted from a metalliferous mass by rendering them solvent consisting in adding to the mass a mixture in definite proportions of two dilute solutions, one being a solution of hypochlorite of a metal of the alkali groups, and the other a solution of ferric salt, the proportions being such as to result in the formation of ferric hypochlorite and ferric chlorid, which will evolve nascent chlorin.

SIDNEY TRIVICK.

Witnesses:
H. D. JAMESON,
A. NUTTING.